(No Model.)
W. KENT.
WATER TUBE BOILER.
No. 326,990. Patented Sept. 29, 1885.
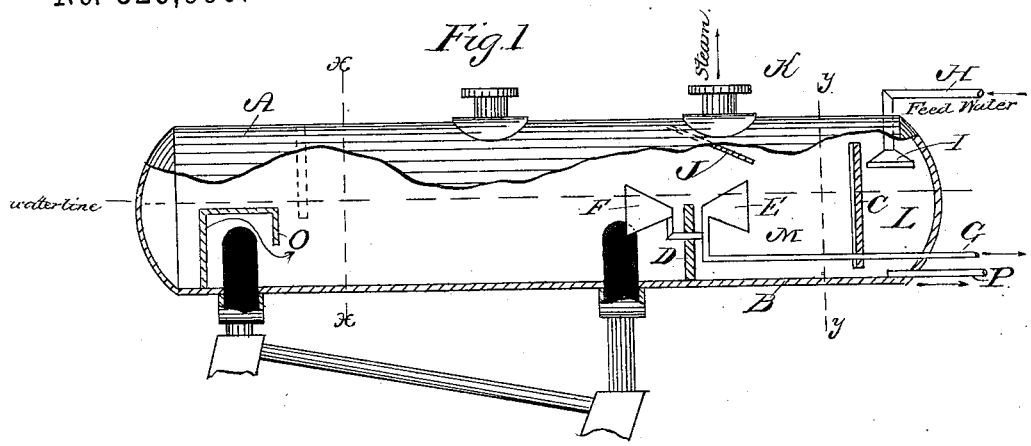
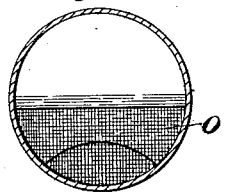
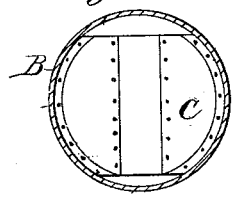
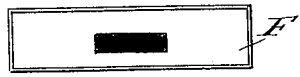
Witnesses
S. S. Williamson
W. P. Haviland
Inventor
William Kent
By Smith & Hubbard, Attys

United States Patent Office.

WILLIAM KENT, OF JERSEY CITY, NEW JERSEY.

WATER-TUBE BOILER.

SPECIFICATION forming part of Letters Patent No. 326,990, dated September 29, 1885.

Application filed October 24, 1884. (No model.)

*To all whom it may concern:*

Be it known that I, WILLIAM KENT, a citizen of the United States, residing at Jersey City, in the county of Hudson and State of New Jersey, have invented certain new and useful Improvements in Water-Tube Boilers; and I do hereby declare the following to be a full, clear, and exact description of the invention, such as will enable others skilled in the art to which it appertains to make and use the same.

This invention relates to certain new and useful improvements in steam - boilers, but more especially to that class known as "water-tube boilers," which are provided with a horizontal water and steam drum, and has for its object to filter and purify the water before entering the tubes, and to prevent the passage of spray or moisture out with the steam; and with these ends in view my invention consists in certain details of construction and combination of elements hereinafter fully and in detail explained, and then specifically designated by the claims.

In order that those skilled in the art to which my invention appertains may fully understand its construction and operation, I will proceed to describe the same in detail, referring by letter to the accompanying drawings, forming a part of this specification, in which—

Figure 1 is a sectional elevation of a water-tube boiler with my improvements applied; Fig. 2, a section taken at the line $x\,x$ of Fig. 1, showing the spray-arrester in elevation; Fig. 3, a section taken at the line $y\,y$, Fig. 1, showing the feed-water partition; and Fig. 4, a front view of one of the scum-catchers.

Similar letters denote like parts in the several figures of the drawings.

A is the water and steam drum, the rear end, B, of which I extend beyond the circulating-tube or "downtake."

C is a partition extending across the extension B, near its rear end, but not reaching the bottom or top. This partition I preferably make in three sections and rivet together and to the drum, as seen in Fig. 3.

D is another partition, extending from the bottom of the drum to near the water-level.

E F are scum-catchers, the former situated in the rear of the partition D, and the latter in the front of said partition. These catchers are constructed with flaring openings, as seen in Figs. 1 and 4. They may be connected to a common blow-off pipe, G, or may each have a separate pipe.

H is the feed-water pipe, which enters the drum back of the partition C, and terminates in a sprinkler, I, above the water-line.

J is a baffle-plate placed at an angle under the nozzle K, the object of which will be presently explained.

Near the forward end of the drum, and over the "takeup," I place a hood or spray-arrester, O, below the water-level, as seen at Figs. 1 and 2, the object of which is to prevent the rising water from the uptake from being thrown into the steam-space, and thereby impregnating the steam with more or less moisture. This object may also be accomplished by the use of a partition extending from the top of the drum below the water-level to the rear of the uptake, as shown in dotted lines, Fig. 1; but I prefer to use the hood.

P is a blow-off pipe of ordinary construction and use.

From the foregoing description the operation of my improvement will be obviously as follows: The feed-water, passing through the sprinkler, will enter the steam-space back of the partition C in a fine spray, and to an extent become heated and separated from its impurities, which settle at the bottom of the drum-extension or in pans, which may be provided for their reception. From the compartment L formed by the partition C the water flows under said partition into the compartment M, where it is still further heated and separated from its impurities, which precipitate, and the water flows slowly over the partition D into the drum proper, the scum-catcher E catching the scum in its course to the top of said partition. As there is more or less current in the water from the uptake to the downtake, I place the catcher F in the track of this flow, so as to take up any scum that may have been developed by the still further heating of the water in the tubes.

The drawing off of steam from the nozzle K and the condensation caused by the feed-water entering the steam-space will cause a current in the steam from the front to the rear of the drum, which tends to bring moisture with the steam to the nozzle; but on reaching the baffle-plate J the direction of the current is changed and the moisture precipitated, allowing the dry steam above the baffle-plate to pass off.

Having thus fully described my invention, what I claim as new and useful is—

1. In a water-tube boiler, the drum prolonged to the rear of the downtake, and having in said prolongation the feed-water inlet and vertical partitions, whereby the impurities are separated from the feed-water before the latter enters the downtake, substantially as shown and set forth.

2. In a steam-boiler, the partition D, situated in the rear of the downtake and dividing the boiler into two compartments, the rear one of which is used as a settling-tank for purifying the feed-water before the latter enters the other, substantially as set forth.

3. A prolongation of the drum of a water-tube steam-boiler in the rear of the downtake, having the partitions C D with the space M between them, forming a settling-tank for the purification of the feed-water, substantially as specified.

4. A water-tube steam-boiler having the water-drum prolonged to the rear of the downtake, and provided with one or more partitions in said prolongation, and having the feed-water-entrance pipe in the steam-space in one of the compartments formed by one of the partitions, substantially as set forth.

5. In a steam-boiler divided into two compartments by the partition D, the scum-catching pan E, with its blow-off pipe G, so placed as to intercept the scum which would otherwise flow from one compartment to the other, substantially as described.

6. In a water-tube boiler, the combination of the prolongation of the drum, the partitions C D, and the scum-catching pan E, substantially as described.

7. In a water-tube boiler provided with a longitudinal steam and water drum, a diaphragm in the steam-space of the drum in the rear of the uptake, dividing the steam-space into two portions and extending below the water-level, substantially as set forth.

In testimony whereof I affix my signature in presence of two witnesses.

WILLIAM KENT.

Witnesses:
S. S. WILLIAMSON,
H. T. SHELTON, Jr.